United States Patent [19]

Hida et al.

[11] Patent Number: 4,733,942

[45] Date of Patent: Mar. 29, 1988

[54] OPTICAL FIBER COATED WITH AN ORGANOPOLYSILOXANE CURABLE WITH ACTINIC RAYS

[75] Inventors: Yoshinori Hida; Shohei Kozakai; Seiji Katayama; Noriyuki Meguriya, all of Annaka, Japan

[73] Assignee: Shin-Etsu Chemical Co., Ltd., Chiyoda, Japan

[21] Appl. No.: 930,002

[22] Filed: Nov. 12, 1986

[30] Foreign Application Priority Data

Nov., 1985 [JP] Japan .................. 60-259275

[51] Int. Cl.$^4$ .............................. G02B 6/00
[52] U.S. Cl. .................. 350/96.34; 428/375; 428/391; 428/426; 428/429; 522/99; 528/26; 528/32; 427/163; 427/165
[58] Field of Search ............ 350/96.34; 428/375, 428/391, 426, 429; 522/99; 528/26, 32; 427/163, 165

[56] References Cited

U.S. PATENT DOCUMENTS

| | | | |
|---|---|---|---|
| 3,933,678 | 1/1976 | Graham | 350/96.34 |
| 4,270,840 | 6/1981 | Uchida et al. | 350/96.34 |
| 4,322,473 | 3/1982 | Hafner et al. | 428/394 |
| 4,344,669 | 8/1982 | Uchida et al. | 428/391 |
| 4,380,367 | 4/1983 | Suzuki | 428/375 |
| 4,505,542 | 3/1985 | Clarke | 350/96.34 |

FOREIGN PATENT DOCUMENTS

| | | | |
|---|---|---|---|
| 897696 | 5/1962 | United Kingdom | 350/96.34 |
| 2038021 | 7/1980 | United Kingdom | 350/96.34 |

Primary Examiner—George F. Lesmes
Assistant Examiner—S. A. Gibson
Attorney, Agent, or Firm—Hopgood, Calimafde, Kalil, Blaustein & Judlowe

[57] ABSTRACT

The coated optical fiber of the invention is prepared by providing a coating layer of an ultraviolet-curable organopolysiloxane or a composition comprising the same and irradiating the coating layer with ultraviolet. Specifically, each of the terminal silicon atoms of the organopolysiloxane, which preferably has a linear molecular structure, has two or more ethylenically unsaturated polymerizable groups bonded thereto through an oxygen atom, such as $CH_2=CHCOOCH_2CH_2-$, $[CH_2=C(CH_3)COOCH_2]_3C-CH_2-$ and $(CH_2=CHCOOCH_2)_2C(C_2H_5)CH_2-$. By virtue of this unique molecular structure of the organopolysiloxane, the coating layer is rapidly cured by ultraviolet irradiation to give a cured coating layer exhibiting very low water absorption and small temperature dependency of the Young's modulus at low temperatures.

3 Claims, No Drawings

OPTICAL FIBER COATED WITH AN ORGANOPOLYSILOXANE CURABLE WITH ACTINIC RAYS

BACKGROUND OF THE INVENTION

The present invention relates to a coated optical fiber or, more particularly, to an optical fiber coated with a layer of a cured organopolysiloxane curable by irradiation with actinic rays and having low water absorption as well as small temperature dependency of the Young's modulus as well as a method for the preparation of such a coated optical fiber.

As is known, various materials are used for optical fibers in service of the optical communication including fused quartz glass, multi-component glass and plastics. In view of the lightweight, low transmission loss, absence of induction, heat resistance and weatherability as well as large transmission capacity, however, most of the optical fibers in practical services are made of fused quartz glass. It is usual that quartz glass-made optical fibers are provided with a coating layer of a certain protecting material since quartz glass fibers are usually very small in diameter and subject to changes of the performance in the lapse of time.

Various materials have been proposed for the coating layer on quartz glass-made optical fibers including so-called silicones and organic polymers. For example, a typical silicone material for optical fiber coating is an organopolysiloxane composition comprising an organopolysiloxane having vinyl groups bonded to the silicon atoms and an organohydrogenpolysiloxane having hydrogen atoms directly bonded to the silicon atoms, of which a cured coating layer is formed by the addition reaction or so-called hydrosilation between the silicon-bonded vinyl groups and silicon-bonded hydrogen atoms in the presence of a platinum catalyst. Another curable silicone material for optical fiber coating is an organopolysiloxane composition comprising a vinyl-containing organopolysiloxane and a mercaptoalkyl-containing organopolysiloxane to effect an addition reaction between the vinyl and mercapto groups. Organic polymers include those by use of a polyether urethane acrylate or polybutadiene urethane acrylate.

These prior art coating materials for optical fibers have their respective problems and disadvantages. For example, the organopolysiloxane compositions by the hydrosilation reaction have a problem that the organohydrogenpolysiloxane is susceptible to the reaction with atmospheric moisture to evolve hydrogen gas which causes increase in the transmission loss through the optical fiber coated therewith. The organopolysiloxane compositions by the mercapto-vinyl addition reaction are sometimes unacceptable due to the very unpleasant odor ascribable to the mercapto groups emitted in the course of the curing reaction. The coating materials based on a polyether urethane acrylate have disadvantages of large water absorption and unduly high rigidity at low temperatures to increase the transmission loss of the coated optical fibers while those based on a polybutadiene urethane acrylate are disadvantageous in respect of the low curability. Accordingly, it is eagerly desired to develop a novel optical fiber coated with a coating material free from the above described problems and disadvantages in the prior art.

SUMMARY OF THE INVENTION

Accordingly, the present invention has an object to provide a novel coated optical fiber of which the above described problems and disadvantages are dissolved by use of a specific organopolysiloxane as the coating material.

Thus, the coated optical fiber of the present invention comprises:

(a) a quartz glass-made optical fiber base; and (b) a coating layer, on the quartz glass-made optical fiber base, of an -organopolysiloxane which is represented by the average unit formula

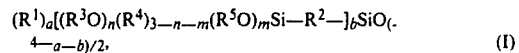

$$(R^1)_a[(R^3O)_n(R^4)_{3-n-m}(R^5O)_mSi-R^2-]_bSiO_{(4-a-b)/2}, \quad (I)$$

in which the groups denoted by $R^1$ and $R^4$ are each, independently from the others, a substituted or unsubstituted monovalent hydrocarbon group, $R^2$ is a divalent hydrocarbon group having 2 to 4 carbon atoms or an oxygen atom, $R^3$ is a monovalent organic group having 4 to 25 carbon atoms and 1 to 3 ethylenically unsaturated groups, $R^5$ is a monovalent hydrocarbon group free from aliphatic unsaturation having 1 to 18 carbon atoms or an organosilyl group of the general formula

$$+SiR^6{}_2-O)_{\overline{p}}SiR^6{}_3, \quad (II)$$

$R^6$ being a monovalent hydrocarbon group having 1 to 9 carbon atoms and p being zero or a positive integer, a is a positive number in the range from 1.6 to 2.2, b is a positive number in the range from 0.02 to 0.5 with the proviso that a+b is in the range from 1.8 to 2.2, n is 1, 2 or 3, m is zero, 1 or 2 with the proviso that n+m is 1, 2 or 3 and $R^3$ has at least two ethylenically unsaturated groups when n is 1.

The present invention also provides a method for the preparation of an optical fiber coated with a layer of a cured organopolysiloxane which comprises coating a quartz glass-made optical fiber base with an organopolysiloxane represented by the above given average unit formula (I) and irradiating the organopolysiloxane with actinic rays such as ultraviolet light.

DETAILED DESCRIPTION OF THE PREFERRED EMBODIMENTS

As is understood from the above given summary of the invention, the most characteristic feature of the inventive coated optical fiber is that the coating layer on the quartz glass-made optical fiber base is formed by curing a specific organopolysiloxane curable by irradiation with actinic rays and represented by the average unit formula (I) given above. The organopolysiloxane is readily cured by irradiation with actinic rays such as ultraviolet so that the process of forming the coating layer on the optical fiber base can be performed with a high efficiency and the thus radiationcured coating layer of the organopolysiloxane has outstandingly low water absorption and temperature dependency of the Young's modulus at low temperatures of, for example $-10°$ to $-30°$ C. Needless to say, the coating material is free from the problem of any unpleasant odor.

The coating material used for forming the coating layer of the inventive coated optical fiber is the above described organopolysiloxane represented by the average unit formula (I) or a composition comprising the same as the principal ingredient. In the formula (I), the groups denoted by the symbols $R^1$ and $R^4$ are each, independently from the others, a monovalent hydrocarbon group having 1 to 9 carbon atoms exemplified by alkyl groups, e.g. methyl, ethyl, propyl, butyl and octyl groups, cycloalkyl groups, e.g. cyclohexyl group, alkenyl groups, e.g. vinyl and allyl groups, aryl groups, e.g. phenyl and tolyl groups, and aralkyl groups, e.g. 3-phenylpropyl group, as well as those substituted groups obtained by the replacement of a part or all of the hydrogen atoms in the above named hydrocarbon groups with substituent atoms and/or groups such as halogen atoms and cyano groups including chloromethyl, 3,3,3-trifluoropropyl and 2-cyanoethyl groups. It is preferable that at least 50% by moles of the groups denoted by the symbols $R^1$ and $R^4$ should be methyl groups and the molar content of phenyl groups, if any, should not exceed 35% of the groups of $R^1$ and $R^4$. When at least a part of $R^1$ and $R^4$ are phenyl groups, the group Rz should preferably be an ethylene group.

The group denoted by the symbol $R^2$ is, when it is a divalent hydrocarbon group having 2 to 4 carbon atoms, exemplified by ethylene, propylene and butylene groups. The group $R^2$ may optionally be an oxygen atom although an oxygen atom as $R^2$ is less preferable in respect of the relatively low resistance of the coating layer against water. The group denoted by the symbol $R^3$ is a monovalent hydrocarbon group having 4 to 25 carbon atoms and having, in a molecule, 1 to 3 ethylenically unsaturated functional groups such as $CH_2=CHCOO-$, $CH_2=C(CH_3)COO-$ and $CH_2=CHCO-$ exemplified by $CH_2=CHCOOCH_2CH_2-$, $[CH_2=C(CH_3)COOCH_2]_3C-CH_2-$ and $(CH_2=CHCOOCH_2)_2C(C_2H_5)CH_2-$. The group denoted by the symbol $R^5$ is, when it is a monovalent hydrocarbon group free from aliphatic unsaturation having 1 to 18 carbon atoms, exemplified by alkyl groups, e.g. methyl, ethyl, propyl, butyl, pentyl and neopentyl groups. Alternatively, the group denoted by $R^5$ may be an organosilyl group represented by the general formula (II) given above, in which $R^6$ has the same meaning as $R^1$ defined above and the subscript p is zero or a positive integer. Examples of such organosilyl groups include methyl ethyl phenyl silyl, trimethyl silyl, dimethyl phenyl silyl and vinyl dimethyl silyl groups with p equal to zero and organosiloxy-substituted silyl groups. The meaning of each of the subscripts a, b, m nad n is defined already. When n is equal to 1, the group $R^3$ should preferably have more than one ethylenically unsaturated functional groups.

Since the group $R^3O$ necessarily contained in the organopolysiloxane is sensitive to actinic rays, the organopolysiloxane can be readily cured by irradiating with actinic rays such as ultraviolet light. The organopolysiloxane should preferably have a viscosity in the range from 1,000 to 20,000 centipoise at 25° C. When the viscosity of the organopolysiloxane is too low, the quartz glass-made optical fiber base is poorly wettable with the organopolysiloxane in addition to the difficulty in obtaining a coating layer thereof having an adequate thickness. When the viscosity of the organopolysiloxane is too high, on the other hand, disadvantages are caused in the removal of air bubbles from the coating layer as well as in respect of the difficulties in obtaining an adequate thickness of the coating layer and decreased workability.

The organopolysiloxane represented by the average unit formula (I) can be prepared by the dehydrochlori-
nation reaction between an organopolysiloxane of a corresponding molecular structure having chlorine atoms directly bonded to the silicon atoms and an ethylenically unsaturated compound having an active hydroxy group in the molecule. The above mentioned chlorine-containing organopolysiloxane is exemplified by those compounds expressed by the following structural formulas, denoting methyl and phenyl groups by the symbols Me and Ph, respectively:

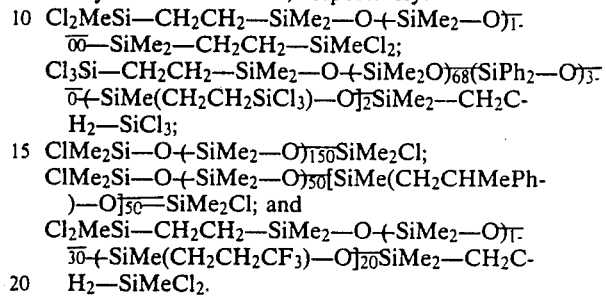

The hydroxy-containing ethylenically unsaturated compound to be reacted with the above described chlorine-containing organopolysiloxane is exemplified by 2-hydroxyethyl (meth)acrylate, trimethylolpropane di(meth)acrylate, pentaerithritol tri(meth)acrylate and the like, of which the last mentioned pentaerithritol derivatives are advantageous since the resultant organopolysiloxane of the average unit formula (I) should preferably have two or more of the ethylenically unsaturated groups bonded to the same silicon atom.

In the above described dehydrochlorination reaction, not all of the chlorine atoms in the chlorine-containing organopolysiloxane must be reacted with the ethylenically unsaturated hydroxy-containing compound. Namely, it is optional with an object to adequately control the viscosity of the organopolysiloxane or hardness of the cured product thereof that a part of the functional groups may be alkoxy groups or organosiloxy groups introduced by the reaction with an alcohol such as methyl alcohol, ethyl alcohol, propyl alcohol, butyl alcohol, 2-methylpropan-1-ol, 2-methylpropan-2-ol, 2,2-dimethylpropan-1-ol and the like or organosilanol compound such as vinyl dimethyl silanol and the like.

Although the coated optical fiber of the invention can be obtained by coating a quartz glass-made optical fiber base with the above described organopolysiloxane alone followed by irradiation with actinic rays to effect curing thereof, it is optional that the organopolysiloxane is admixed with various kinds of additives. For example, physical properties of the cured coating layer can be modified by admixing the organopolysiloxane with an acrylic monomer or an oligomer thereof.

Various kinds of actinic rays are effective to cure the coating layer of the organopolysiloxane or a composition comprising the same as the principal ingredient including ultraviolet light, far-ultraviolet light, electron beams, X-rays, γ-rays and the like, of which ultraviolet is preferred in respect of the simplicity and hadiness of the apparatus. The ultraviolet lamp suitable as the irradiation source includes high- and low-pressure mercury lamps, xenon lamps, hydrogen discharge tubes and the like. The irradiation with the actinic rays can be performed in any desired gaseous atmosphere such as air and inert gases.

It is sometimes advantageous depending on the type of the actinic rays for the irradiation of the coating layer that the organopolysiloxane is admixed with a photosensitizer or photopolymerization initiator such as benzophenone compounds, e.g. benzophenone, benzoin ether compounds, e.g. benzoin isobutyl ether, ketal compounds, e.g. acetophenone diethyl ketal, thioxanthone compounds, acetophenone compounds and the like in an amount not exceeding 20% by weight or, preferably, in the range from 1 to 5% by weight based on the organopolysiloxane.

The coated optical fiber of the invention has excellent resistance against heat and water and low water absorption of the coating layer in comparison with conventional coated optical fibers in addition to the outstandingly low temperature dependency of the Young's modulus. Accordingly, the inventive coated optical fiber is sevicealbe over a long period of time under any severest environmental conditions.

In the following, the coated optical fiber of the invention is described in more detail with reference to the examples preceded by the description of the preparation procedure of the organopolysiloxanes as the coating material on the optical fiber base.

PREPARATION 1

Into a flask of 1 liter capacity equipped with a stirrer, reflux condenser, dropping funnel, thermometer and gas inlet tube were introduced 452 g of a chlorine-containing organopolysiloxane 1 expressed by an average structural formula $$Cl_2MeSi-CH_2CH_2-SiMe_2-(O-SiMe_2)_{11}-$$
$$_{98}O-SiMe_2-CH_2CH_2-SiMeCl_2$$

and 300 g of diisopropyl ether followed by the addition of 14.6 g of triethyl amine and 54 g of pentaerithritol triacrylate having a hydroxy value of 130.5 and containing 0.2% of dibutyl hydroxytoluene as a polymerization inhibitor to form a reaction mixture.

The reaction mixture was heated under agitation at 70° C. for 7 hours and then cooled to room temperature followed by filtration to remove the precipitated salt and distillation of the filtrate at 65° C. under a reduced pressure to remove the solvent. The filtrate freed from the solvent was filtered again under pressurization. The thus obtained product was a clear and oily organopolysiloxane expressed by the formula
[(CH$_2$=CHCOOCH$_2$)$_3$CCH$_2$O]$_2$MeSi—CH$_2$CH$_2$—SiMe$_2$-(O—SiM$_2$)$_{198}$—O—SiMe$_2$—CH$_2$CH$_2$—SiMe]OCH$_2$C(CH$_2$OCOCH=CH$_2$)$_3$]$_2$.

This product is referred to as Organopolysiloxane I hereinbelow.

PREPARATION 2

Into the same reaction vessel as used in Preparation 1 were introduced 350 g of the chlorine-containing organopolysiloxane 2 shown by the formula given below and 300 g of toluene followed by the addition of 32 g of triethyl amine and 22 g of 2-hydroxyacrylate containing 0.2% by weight of dibutyl hydroxytoluene and the mixture was heated at 70° C. under agitation. After 2 hours of agitation at the same temperature, the reaction mixture was admixed with 8.5 g of trimethyl silanol and further agitated for additional 3 hours to complete the reaction. The reaction mixture cooled to room temperature was filtered and the filtrate was freed from the solvent by distillation under reduced pressure at 100° C. followed by further filtration to give a product, which is shown by the formula given below and referred to as Organopolysiloxane II hereinbelow.

Chlorine-containing organopolysiloxane 2:

$$Cl_3Si-(CH_2)_2SiMe_2-(O)_{60}(SiPh_2O)_5-$$
$$\overline{0}-SiMe(CH_2CH_2SiCl_3)-O-SiMe_2-(CH_2)_7-$$
$$_7SiCl_3$$

Organopolysiloxane II:

$$(CH_2=CHCOOCH_2CH_2O)_2Si(OSiMe_3)-(CH_2)_2$$

$$-SiMe_2-O-(SiMe_2-O)_{69}-(SiPh_2-O)_{30}-$$

$$-SiMe[CH_2CH_2Si(OSiMe_3)(OCH_2CH_2OCOCH=CH_2)_2]-$$

$$-O-SiMe_2-(CH_2)_2Si(OSiMe_3)(OCH_2CH_2OCOCH=CH_2)_2$$

PREPARATION 3 to 6

The synthetic procedure in each of these Preparations was substantially the same as in Preparation 2 described above except that the starting chlorine containing organopolysiloxane 3, 4, 5 or 6, amount thereof, the ethylenically unsaturated compound and amount thereof, the amount of triethyl amine added to the reaction mixture and the organopolysiloxane product, referred to as Organopolysiloxane III, IV, V or VI hereinbelow, were as shown in the following by the respective structural formula, when appropriate. In Preparation 3, 2.8 g of methyl alcohol were additionally added to the reaction mixture. The organopolysiloxane VI was prepared for comparative purpose.

(PREPARATION 3)

Chlorine-containing organopolysiloxane 3: 424 g $$Cl_2Si(Me)-(CH_2)_2SiMe_2-O-(SiMe_2-O)_{11}-$$
$$\overline{00}-(SiMe(CH_2CH_2CF_3)-O)_{20}SiMe_2-(CH_2)_7-$$
$$_7SiMeCl_2$$

Pentaerithritol triacrylate: 34 g
Triethyl amine: 18 g
Organopolysiloxane III:

$$(CH_2=CHCOOCH_2)_3CCH_2O-SiMe(OMe)-(CH_2)_2SiMe_2-O-$$

$$-(SiMe_2-O)_{100}-(SiMe(CH_2CH_2CF_3)-O)_{20}-SiMe_2-$$

$$-(CH_2)_2SiMe(OMe)-OCH_2C(CH_2OCOCH=CH_2)_3$$

(PREPARATION 4)

Chlorine-containing organopolysiloxane 4: 448 g $$ClSiMe_2-O-(SiMe_2-O)_{68}(SiMe(CH_2CH_2SiMe_2Cl)-O)_2=SiMe_2Cl$$

Trimethylolpropane dimethacrylate: 45 g
Triethyl amine: 18 g
Organopolysiloxane IV:

$$(CH_2=CMeCOOCH_2)_2CEt-CH_2-O-SiMe_2-O-(SiMe_2-O)_{68}$$

$$-(SiMe-O)_2SiMe_2-O-CH_2-CEt(CH_2OCOCMe=CH_2)_2$$
$$|$$
$$CH_2CH_2SiMe_2-O-CH_2-CEt(CH_2OCOCMe=CH_2)_2$$

(PREPARATION 5)

Chlorine-containing organopolysiloxane 5: 344 g

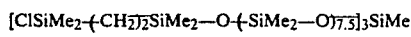

pentaerithritol triacrylate: 200 g
Triethyl amine: 50 g
Organopolysiloxane V:

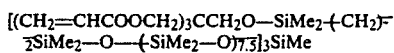

(PREPARATION 6)

Chlorine-containing organopolysiloxane 6: 380 g

2-Hydroxyethyl acrylate: 12 g
Triethyl amine: 11 g
Organopolysiloxane VI:

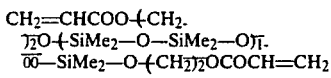

EXAMPLES 1 to 5 AND COMPARATIVE EXAMPLES 1 to 3

A curable organopolysiloxane composition was prepared by uniformly blending 2 parts of benzophenone with 100 parts of one of the Organopolysiloxanes I to VI obtained in the above described Preparations 1 to 6. The Organopolysiloxanes I to V were for Examples 1 to 5, respectively, and the Organopolysiloxane VI was for Comparative Example 1. An optical fiber base of fused quartz glass having a diameter of 125 μm and obtained by spinning at a velocity of 30 meters/minute was coated with the composition in a coating thickness of 50 μm and irradiated with ultraviolet light from a high-pressure mercury lamp having a linear output of 80 watts/cm at a distance of 10 cm for 0.4 second to give a dose of 100 mJ/cm² so that it was found that the coating layers in Examples 1 to 5 had been fully cured into a uniform coating film having a smooth and uniform surface without stickiness. On the other hand, curing of the coating layer in Comparative Example 1 was not complete leaving considerable stickiness on the surface.

For further comparison, the Organopolysiloxanes I to VI and two non-silicone coating materials conventionally used in optical fiber coating (Comparative Examples 2 and 3) with admixture of 2% by weight of benzophenone were each shaped into a sheet of 1 mm thickness, which was irradiated with a high-pressure mercury lamp having a linear output of 80 watts/cm to give a dose of 300 mJ/cm². The coating materials used in Comparative Examples 2 and 3 were a polyether urethane acrylate and a polybutadiene urethane acrylate, repectively, expressed by the following formulas, in which ($C_6H_3Me$) is a 1,4-tolylene group.

(COMPARATIVE EXAMPLE 2)

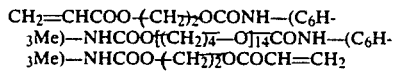

(COMPARATIVE EXAMPLE 3)

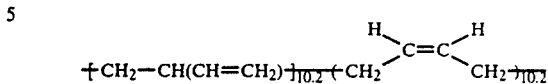

These ultraviolet-cured sheets were examined for the surface condition and subjected to the determination of water absorption and temperature dependency of the Young's modulus at low temperatures to give the results shown in the table below. In the table, the results of the evaluation are given by rating in two, four or three grades for the surface condition, water absorption and temperature dependency of Young's modulus according to the following criteria. The water absorption was determined in the following manner. Thus, a cured sheet of 0.5 mm by 50 mm by 50 mm which was immersed for 24 hours in pure water at 25° C. and the weight $W_1$ was determined after being freed from water on the surface. Thereafter, the test piece was kept in a desiccator of calcium chloride until the test piece lost no additional weight to have a constant weight $W_2$. The water absorption in % was given by $(W_1-W_2)/W_2 \times 100$.

Surface condition

A: The sheet was uniformly cured without surface tackiness.
B: The surface had tackiness to retain finger prints by touching with a finger tip.

Water absorption

A: less than 1.0%
B: 1.0 to 2.0%
C: larger than 2.0%

Temperature dependency of Young's modulus

A: small temperature dependency at −30° C. or below
B: small dependency at −30° to −10° C.
C: relatively large at −10° C. or higher

TABLE

| | Example | | | | | Comparative Example | | |
|---|---|---|---|---|---|---|---|---|
| | 1 | 2 | 3 | 4 | 5 | 1 | 2 | 3 |
| Surface condition | A | A | A | A | A | B | A | B |
| Water absorption | A | A | A | A | B | A | C | A |
| Young's modulus | A | B | A | A | A | A | C | A |

What is claimed is:
1. A coated optical fiber which comprises:
(a) a fused quartz glass-made optical fiber base; and
(b) a coating layer on the optical fiber base formed of a coating material comprising, as the principal ingredient thereof, an organopolysiloxane represented by the average unit formula

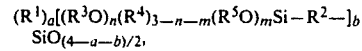

in which the groups denoted by $R^1$ and $R^4$ are each, independently from the others, a substituted or unsubstituted monovalent hydrocarbon group, $R^2$ is a divalent hydrocarbon group having 2 to 4 carbon atoms or an oxygen atom, $R^3$ is a monovalent organic group having 4 to 25 carbon atoms and 1 to 3 ethylenically unsaturated groups, $R^5$ is a monovalent hydrocarbon group free from aliphatic unsaturation having 1 to 18 carbon atoms or an organosilyl group represented by the general formula $$(SiR^6{}_2-O)_p SiR^6{}_3,$$

$R^6$ being a monovalent hydrocarbon group having 1 to 9 carbon atoms and p being zero or a positive integer, a is a positive number in the range from 1.6 to 2.2, b is a positive number in the range from 0.02 to 0.5 with the proviso that a+b is in the range from 1.8 to 2.2, n is 1, 2 or 3, m is zero, 1 or 2 with the proviso that n+m is 1, 2 or 3 and $R^3$ has at least two ethylenically unsaturated groups when n is 1.

2. A method for the preparation of a coated optical fiber which comprises the steps of:
 (a) coating a fused quartz glass-made optical fiber base with a coating material comprising, as the principal ingredient thereof, an organopolysiloxane represented by the average unit formula $$(R^1)_a[(R^3O)_n(R^4)_{3-n-m}(R^5O)_m Si-R^2-]_b SiO_{(4-a-b)/2},$$

in which the groups denoted by $R^1$ and $R^4$ are each, independently from the others, a substituted or unsubstituted monovalent hydrocarbon group, $R^2$ is a divalent hydrocarbon group having 2 to 4 carbon atoms or an oxygen atom, $R^3$ is a monovalent organic group having 4 to 25 carbon atoms and 1 to 3 ethylenically unsaturated groups, $R^5$ is a monovalent hydrocarbon group free from aliphatic unsaturation having 1 to 18 carbon atoms or an organosilyl group represented by the general formula $$(SiR^6{}_2-O)_p SiR^6{}_3,$$

$R^6$ being a monovalent hydrocarbon group having 1 to 9 carbon atoms and p being zero or a positive integer, a is a positive number in the range from 1.6 to 2.2, b is a positive number in the range from 0.02 to 0.5 with the proviso that a+b is in the range from 1.8 to 2.2, n is 1, 2 or 3, m is zero, 1 or 2 with the proviso that n+m is 1, 2 or 3 and $R^3$ has at least two ethylenically unsaturated groups when n is 1, to form a coating layer; and
 (b) irradiating the coating layer with ultraviolet light to cure the organopolysiloxane.

3. The method as claimed in claim 2 wherein the group denoted by $R^3$ is selected from the class consisting of 2-acryloxyethyl of the formula $CH_2=CHCOOCH_2-CH_2-$, 2,2,2-tri(methacryloxymethyl)ethyl of the formula $[CH_2=C(CH_3)COOCH_2]_3C-CH_2-$ and 2,2-di(acryloxymethyl)butyl of the formula $(CH_2=CHCOOCH_2)_2C(C_2H_5)-CH_2-$.

* * * * *